United States Patent Office 2,881,079
Patented Apr. 7, 1959

2,881,079

METHOD OF TREATING FOOD ARTICLES BY APPLICATION OF SOUND ENERGY

Luther G. Simjian, Greenwich, Conn., assignor to The Reflectone Corporation, Stamford, Conn., a corporation of Connecticut No Drawing. Application December 12, 1957
Serial No. 702,268

7 Claims. (Cl. 99—217)

This application is a continuation-in-part of my co-pending application, Serial No. 695,508, filed November 12, 1957, now abandoned.

This invention generally relates to treatment of articles and more specifically has reference to the treatment of articles by the application of sound energy in the audible and inaudible high frequency range. The instant invention is particularly useful for treatment of bean-like articles such as coffee beans, corn, kidney beans, rice, peanuts, peas, chickpeas, almonds, chestnuts, but may be applied similarly to other products, for instance certain types of meat, vegetables such as beans, or fruit, or similar articles.

In U.S. Letters Patent, No. 2,806,246, entitled "Food Tenderizer," dated September 17, 1957, and in my co-pending application for U.S. Letters Patent Serial No. 537,720, filed September 30, 1955, entitled "Food Tenderizer," now U.S. Patent 2,830,912, issued April 15, 1958, I disclose an apparatus and means respectively for the treatment of articles by the application of sound energy in order to render these articles more tender. The apparatus and method described in the patent and patent application referenced concerns primarily the treatment of a normally deformable article of food which is first rigidified in order to permit sound energy which is subsequently applied thereto to penetrate the article thereby causing the article as a result of this treatment to become tenderized. It is well known that a "soft" medium acts as an attenuator for compressive wave energy, and in order that the full sound energy may be utilized for tenderization, the article so to be treated must be suitably conditioned before hand in order to permit substantially unimpeded penetration of the energy through the article.

As disclosed in my U.S. Letters Patent and in the application referenced above certain articles, for instance fresh meat, may be suitably conditioned for acceptance of the sound energy by freezing so that the articles present a rigid body to the sound energy. In the present application I am disclosing a new and different method of conditioning articles so that sound energy may be applied to many other articles thereby improving the general characteristics of those articles, particularly improving their subsequent processing. In line with my investigation I have found that certain articles may be conditioned for subsequent exposure to sound energy by first dehydrating the articles so that they become substantially brittle and rigid. In this manner it has been possible to treat articles which either by virtue of their general properties, economics or in view of subsequent processing, could not readily be rigidified or rendered suitable for acceptance of sound energy by the use of the freezing method disclosed heretofore.

Experiments have shown that processing of bean or kernel type products for instance, can remarkably be expedited by first substantially dehydrating these products so that the characteristics of each individual kernel or bean is changed from a substantially elastic state to a substantially rigid or brittle status and then treating the article by the application of sound energy.

When articles of the type described above are treated in the manner indicated, further processing which may involve the application of heat for the purpose of cooking, baking, roasting, expanding, etc. can be greatly improved and accelerated. This improvement in processing appears to be caused by the fact that the sound energy, provided the energy is of sufficient strength and applied for an adequate amount of time, loosens and tears, and in some instances partially disintegrates, some of the inner constituents of the article while leaving the protective outer enclosure substantially undamaged.

One of the objects of this invention therefore is the application of sound energy within the audible or inaudible high frequency range to an article in order to improve its processing.

Another object of this invention is the provision of a method which serves to expedite the application of heat to an article which is to be processed.

Another object of this invention is the provision of a method for causing an article to become substantially brittle by dehydrating it and subsequently applying thereto high frequency vibrations.

Another object of this invention is to provide a method of treating an article with compressive wave energy when the article is in its pre-processed stage so as to aid subsequent processing.

Another object of this invention is the provision of a method which comprises the preparation of an article so that sound energy is capable of penetration therethrough.

A further object of this invention is the provision of means for retaining and improving the flavor and aroma of certain articles.

Another and further object of this invention is the provision of a method for loosening, breaking, and partially disintegrating the inner constituents of an article without affecting the exterior shape and configuration of the article.

Still further objects and advantages of this invention will be apparent from the following detailed description of the method and apparatus employed.

In order to retain and preserve the flavor in articles, such as coffee beans, and to expedite the processing of other articles, for instance corn and rice used for cereal preparation, it has been found that the application of sound energy in the audible and inaudible high frequency range offers considerable advantages and exhibits very beneficial effects. To carry out the method, the article which in its natural state usually is afflicted with certain elastic properties, is first rendered substantially brittle by means of partial or substantial dehydration. Subsequently, the article prior to further processing such as grinding or total sectioning or application of heat is exposed to high energy sonic vibrations so that the inner constituents of the article which are confined within the article enclosure become loosened, and in some instances, partially disintegrated. The enclosure of the article as used herein may define but not be limited to the shell, the peel, the skin, or generally the outer surface which encloses the article. By virtue of this treatment which involves the loosening, breaking, or tearing of the inner constituents, subsequent processing is greatly expedited and any ensuing treatment by heat appreciably reduced.

It is well known that the length of time during which a bean, such as coffee, is exposed to heat has a marked effect on the flavor and aroma. By virtue of the instant process the penetration of heat into the article is not only greatly accelerated but the heat also is more evenly distributed throughout the article thus reducing the overall processing time and expense. It is apparent that the very same process is applicable to processing of corn for cereal purposes where the length of processing time and amount of heat has an important influence upon the nutritional value. Any reduction in processing time and lowering of heat causes greater retention of the nutritional substances aside from considerable economic advantages.

The apparatus used for generating the sound energy, in one preferred form, comprises an electrically energized oscillator and amplifier which is coupled to a magnetostrictive transducer which may operate in a frequency range from a few kilocycles to about 50 kilocycles. Transducers of this type operate with power of several hundered watts per transducer head. It will be understood, however, that other means for generating sound energy, such as piezoelectric transducers which operate at higher frequencies and at different power levels, or acoustic resonators, or any other means for producing sonic or ultrasonic vibrations may be used to generate the energy desired without deviation from the principle of the instant invention.

Although the articles to be treated may be coupled directly to the sound energy without employing distinct and separate coupling media, in which case the energy will enter the article primarily at the portion in communication with the transducer, whereby certain properties of the article become altered, it will be advantageous in many instances to employ a coupling medium such as a liquid in order to obtain a higher degree of coupling between the transducer and irregular surfaces of the articles to be treated. A typical arrangement may include for instance, a body of water into which the transducer and the article to be treated are immersed whereby the liquid acts as the coupling medium. The article to be treated may be backed by a sound wave reflector to increase overall power and efficiency. It has been found that a short time exposure in water does not cause appreciable water absorption by the previously dehydrated article and that the article will be penetrated by the sound energy for a considerable length of time while being immersed in the liquid. When treating relative small loose articles in a liquid the articles may be confined within a thin cloth container, such as gauze, which offers no appreciable resistance to the penetration of sound energy. In some instances it will be advantageous to confine a batch of articles within a waterproof enclosure to shield the substantially dehydrated product from the effects of the surrounding liquid.

Typical processing of articles on a batch basis involves the steps of substantially dehydrating the articles and then exposing the batch to sound energy in the one to fifty kilocycle frequency range using one or more magnetostrictive transducer heads, each transducer head receiving about 250 watts average power at 1500 watts peak power, and a processing time of several minutes. It will be understood however by those skilled in the art, that these figures are merely illustrative and that many other combinations will produce equally satisfactory results.

When treating certain bean products in this manner, it has been found that subsequent roasting time is greatly reduced. Microscopic investigations on dehydrated coffee beans showed that beans which had been treated by means of sound energy exhibited broken and partially disintegrated inner constituents, while the same beans prior to treatment exhibited a fibrous type texture. It is believed that the breaking and shattering of the inner constituents establishes a more uniform cross section throughout the product which permits faster and more even penetration of the heat. Substantially the same results are achieved with other products including vegetables, meat, fruit and similar articles.

It shall be clearly understood that the method described herein will not be limited to the specific products and articles enumerated but may be applied to many other articles which may fall within the scope of the instant method.

While there have been described certain embodiments of the present invention, it will be apparent to those skilled in the art that many variations and modifications may be made therein without departing from the principle and spirit of the present invention which shall be limited only by the scope of the appended claims.

What is claimed is:

1. The method of treating an article of food which comprises the steps of substantially dehydrating the article and exposing the article to sound energy within the range of audible and inaudible high frequencies in order to aid the subsequent processing of the article.

2. The method of treating an article of food which comprises the steps of substantially dehydrating the article to the extent necessary to cause compressive wave energy within the range of audible and inaudible high frequencies to pass therethrough and then applying said energy to the article whereby the article is conditioned so as to improve its characteristics for further processing.

3. The method of treating an article of food which comprises the steps of substantially dehydrating the article to the extent necessary to render the article substantially brittle and subsequently applying sound energy within the range of audible and inaudible high frequencies to the article whereby said energy is sufficient to affect the characteristics of the article for subsequent processing.

4. The method of treating an article of food which comprises the steps of dehydrating the article to the degree of making it sufficiently brittle to accept high frequency sound energy vibration and applying said energy at one part of the article, said energy being transmitted through the entire article, whereby certain properties of the article become altered.

5. The method of treating an article of food which comprises the steps of conditioning the article by dehydration to the degree necessary to render it penetrable by compressive wave energy within the range of audible and inaudible high frequencies and applying said energy to said article with sufficient energy and for a sufficient length of time to alter the structure of the article's inner constituents in order to accelerate subsequent processing of the article.

6. The method of treating an article of food which comprises the steps of substantially dehydrating the article, placing the article in a coupling medium and applying sound energy in the range of audible and inaudible high frequencies to said coupling medium before said medium substantially affects the dehydrated condition of said article whereby said energy is penetrating the article and altering its properties so as to expedite subsequent processing.

7. The method of treating an article of food which comprises the steps of substantially dehydrating the article, placing the article in a liquid coupling medium and applying sound energy within the range of audible and inaudible high frequencies through said coupling medium to said article and removing the article from said medium before the medium substantially affects the dehydrated condition of said article, whereby the energy penetrating the article causes a change in the property of the article and aids subsequent processing of the article.

References Cited in the file of this patent

UNITED STATES PATENTS 2,830,912    Simjian _____ Apr. 15, 1958

FOREIGN PATENTS 1,592/31    Australia _____ July 28, 1931